Patented May 19, 1936

2,040,826

UNITED STATES PATENT OFFICE 2,040,826

PROCESS OF TREATING BRASS AND BRONZE SECONDARY METALS

Jesse O. Betterton and Albert J. Phillips, Metuchen, N. J., assignors to American Smelting and Refining Company, New York, N. Y., a corporation of New Jersey No Drawing. Application December 7, 1933, Serial No. 701,338. Renewed November 10, 1934

11 Claims. (Cl. 75—17)

This invention relates to a process of selectively separating and recovering metallic values from brass and bronze secondary metals.

By the present invention the alloy scrap, which generally contains copper, zinc, tin and lead as its major constituents, is treated in such manner that sharp separations between the metallic values are readily obtained and the waste and expense ordinarily involved in retreating intermediate products to place same in marketable form are materially reduced or eliminated.

Other features and advantages of the invention will be readily apparent from the process hereinafter described and more particularly set forth in the claims.

In accordance with the invention, the alloy scrap, after any desired or necessary preliminary treatment, is charged to a converter and treated in a manner adapted to selectively remove in successive stages the zinc and tin contents, respectively. The copper, high in oxygen and containing a portion of the lead originally present, is then removed from the converter and either cast or directly transferred to an anode furnace from which it is cast into anodes.

The following description of the invention as applied to the treatment of old radiators will serve to more fully illustrate the advantages of the present invention and a specific manner in which it may be practised, but such description is not to be construed as in any manner limiting the invention.

The radiators, as received, are first sweated to remove solder and metallic iron, which can be readily severed, is removed. The radiators may then be charged to an ordinary reverberatory furnace and the iron slagged. The molten charge is then transferred to an ordinary tiltable converter and a relatively thick bed or layer of coke or its equivalent, say 10–20 inches, applied over the entire surface of the charge.

The charge is then blown with air in the usual manner, but instead of a mixed dust and fume of different elements (lead, tin and zinc), a fume high in zinc and low in other constituents is obtained. In other words, it has been found that by covering the converter charge with a dense layer of coke during the blowing the zinc oxide will pass off preferentially while part of the lead and nearly all of the tin will be retained in the bath. In addition, this selective separation is very efficient as the zinc content of the metal can be reduced to less than 1%, while at the same time 80% or more of the tin is retained in the metal. When necessary the coke layer is replenished to maintain a satisfactory layer of same during the entire time that the charge is being oxidized for the elimination of zinc.

When the zinc has been removed to the limits desired (1% or less) the coke layer is skimmed or otherwise removed or materially reduced in thickness as by burning off. If mechanically removed, it is advantageously returned to the reverberatory slagging furnace with a new charge where it gives up the bulk of its tin, thus materially reducing waste of that element as the slag from the reverberatory is of discard grade.

Following the removal of the coke layer from the converter, the charge is further oxidized with the result that fume rich in tin and containing considerable amounts of lead but relatively little zinc is produced. The tin that does not enter the fume is removed as a concentrated dross from the converter. The copper remaining in the converter contains some lead and is saturated with oxygen and is, therefore, treated in an anode furnace prior to being cast into anodes.

It is thus apparent that the process of the present invention, by reason of the selective separations effected, is of decided commercial importance and marks a distinct advance over the processes heretofore employed. By reason of the selective removal of the zinc and tin, concentrated products are obtained which may readily be processed as marketable products. The efficiency of the process in making sharp separations between the constituents is amply illustrated by the following example in which scrap brass analyzing 75.2% copper, 5.6% lead, 5.3% tin and 13.9% (by difference) zinc was covered with a deep layer of coke and the charge at a temperature of about 2300° F. was blown with air. As a result the zinc content of the charge was reduced to only a trace, the charge analyzing 89.5% copper, 4.3% lead and 6.2% tin. The coke layer was then removed and the blowing resumed whereby all of the tin was removed and the residual metal analyzed 99.2% copper and 0.4% lead.

While certain novel features of the invention have been disclosed and are pointed out in the annexed claims, it will be understood that various omissions, substitutions and changes may be made by those skilled in the art without departing from the spirit of the invention.

What is claimed is:

1. The process of treating scrap radiators which comprises in sequence sweating the radiators to remove solder, melting said radiators and slagging the iron present, charging the molten copper containing zinc, tin and lead to an ordinary converter under a layer of coke approximately 10-20 inches thick, blowing the metal with air thereby eliminating the bulk of the zinc as fume, removing the coke layer and continuing the blowing thereby oxidizing the tin and recovering same as dross and tin-rich fume, and thereafter treating the copper in an anode furnace preparatory to casting same into anodes and recovering the copper by electrolysis.

2. The process according to claim 1 in which additional coke is added to the layer as the elimination of zinc progresses.

3. The process of treating brass or bronze secondary metals which comprises charging same to a converter, covering the entire surface of the molten metal with a layer of coke of substantial thickness and blowing the charge with air until practically all of the zinc is removed, then removing the coke layer and continuing the blowing until practically all of the tin is removed from the metal and thereafter refining the copper in an anode furnace and electrolyzing the anodes cast therefrom.

4. The process of treating brass or bronze secondary metals which comprises charging same to a reverberatory furnace to slag iron, transferring the molten metal to a converter, covering the entire surface of the molten metal with a layer of coke of substantial thickness and blowing the charge with air until practically all of the zinc is removed, then removing the coke layer and continuing the blowing until practically all of the tin is removed from the bath, and thereafter treating the copper in an anode furnace and electrolyzing the anodes cast therefrom.

5. The method of selectively separating zinc and tin from copper alloy scrap which comprises covering a molten bath of said scrap with a dense layer of coke and blowing the bath with air thereby preferentially eliminating the zinc as fume, removing the coke layer when substantially all of the zinc has been eliminated and continuing the blowing thereby eliminating tin as a tin-rich fume and dross.

6. The method of treating copper alloy scrap containing lead, tin and zinc which comprises establishing a molten bath of the scrap in a converter, covering the entire surface of the molten metal with a dense layer of coke and blowing the bath with air thereby eliminating zinc from the bath as a rich zinc fume, removing the coke layer when the zinc content of the bath is reduced below one percent and continuing the blowing of the bath thereby producing a rich tin fume and thereafter refining the copper in an anode furnace for the production of copper anodes suitable for electrolysis.

7. The method of treating copper alloy scrap containing lead, tin and zinc which comprises establishing a molten bath of the scrap in a converter, covering the entire surface of the molten metal with a dense layer of coke and blowing the bath with air thereby eliminating zinc from the bath as a rich zinc fume, removing the coke layer when the zinc content of the bath is reduced below one percent and continuing the blowing of the bath thereby eliminating tin as dross and rich tin fume and thereafter refining the copper in an anode furnace for the production of copper anodes suitable for electrolysis.

8. The process for treating copper alloy scrap to selectively remove zinc and tin as concentrated oxide products which comprises blowing a molten bath of such scrap with air under a dense layer of coke and maintaining the thickness of said layer by additions of coke as the blowing progresses thereby eliminating the zinc in concentrated form without removing substantial amounts of tin, materially reducing the thickness of the coke layer to at most a thin layer when substantially all of the zinc has been eliminated and continuing the blowing thereby removing the tin in concentrated form.

9. The method of selectively separating zinc and tin from brass or bronze secondary metal which comprises covering a molten bath of such metal with a coke blanket of substantial thickness and blowing the bath with air thereby preferentially removing the zinc, removing the bulk of the coke layer when practically all of the zinc has been eliminated and continuing the blowing with air thereby removing the tin.

10. In treating copper alloys containing tin and zinc by blowing air through a molten bath of such alloys, the improvement which consists in performing the operation under cover of a layer of suitable carbonaceous reducing material sufficiently thick to effectively prevent removal of the bulk of the tin from the system while simultaneously permitting the volatilization and removal of practically all of the zinc.

11. The process for treating copper alloys containing tin and zinc which consists in blowing air through a molten bath of such alloys while blanketing said bath sufficiently to prevent removal of the bulk of the tin from the bath while simultaneously permitting the voltalizaion of practically all of the zinc and thereafter concentrating the tin content in a substantially zinc free state.

JESSE O. BETTERTON.
ALBERT J. PHILLIPS.